(12) United States Patent
Zen et al.

(10) Patent No.: US 7,905,382 B2
(45) Date of Patent: Mar. 15, 2011

(54) WAVE SOLDERING TANK

(75) Inventors: Mitsuo Zen, Souka (JP); Hirokazu Ichikawa, Souka (JP); Satoshi Ozawa, Chiba (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 12/226,654

(22) PCT Filed: Apr. 24, 2007

(86) PCT No.: PCT/JP2007/058823
§ 371 (c)(1),
(2), (4) Date: Apr. 3, 2009

(87) PCT Pub. No.: WO2007/123237
PCT Pub. Date: Nov. 1, 2007

(65) Prior Publication Data
US 2009/0321498 A1 Dec. 31, 2009

(30) Foreign Application Priority Data
Apr. 26, 2006 (JP) .................................. 2006-121501

(51) Int. Cl.
B23K 1/08 (2006.01)
B23K 31/02 (2006.01)
(52) U.S. Cl. ............... 228/37; 228/33; 228/34; 228/260
(58) Field of Classification Search ............... 228/37.26, 228/33–35, 256–262
See application file for complete search history.

(56) References Cited

U.S. PATENT DOCUMENTS

| 5,209,389 A | * | 5/1993 | Sullivan et al. | ................. 228/37 |
| 5,566,875 A | | 10/1996 | Hwang | ........................... 228/37 |
| 2008/0093417 A1 | * | 4/2008 | Takaguchi et al. | .............. 228/37 |

FOREIGN PATENT DOCUMENTS

| EP | 2022590 | 2/2009 |
| JP | 5256018 | 4/1977 |
| JP | 56023371 | 3/1981 |
| JP | 62151261 | 7/1987 |
| JP | 01150462 | 6/1989 |
| JP | 0336362 | 4/1991 |
| JP | 05050224 | 3/1993 |
| JP | 0619968 | 3/1994 |
| JP | 06246433 | 9/1994 |
| JP | 2000114708 | 4/2000 |
| JP | 2000114708 A | * 4/2000 |

* cited by examiner

*Primary Examiner* — Jessica L Ward
*Assistant Examiner* — Devang R Patel
(74) *Attorney, Agent, or Firm* — Michael Tobias

(57) ABSTRACT

A wave soldering tank is provided on which it is easy to perform maintenance, which does not have fluctuation of the height of spouted solder, which does not damage the rotating shaft of a discharge pump, and which can be stably used for long periods.

The wave soldering tank 1 has a tank body 1a which houses molten solder S, a discharge pump 5 which pumps molten solder S, a discharge nozzle 4 which spouts molten solder S which was sent to it by the discharge pump 5 upwards, a duct 2 having the discharge pump 5 installed at one of its ends and the discharge nozzle 4 installed at its other end, an oxidation preventing member 22 which has a prescribed size and which floats on the surface of the molten solder S, and an engaging means 13 which controls rotation of the oxidation preventing member 22 in a horizontal plane. The oxidation preventing member 22 has a surrounding member 28 which extends downwards at its center and which surrounds the rotating shaft 10 with a gap between it and the rotating shaft 10, and a hollow space 26 in its interior for providing buoyancy.

15 Claims, 6 Drawing Sheets

(A)

(B)

(C)

WAVE SOLDERING TANK

TECHNICAL FIELD

This invention relates to a wave soldering tank, and specifically, it relates to a wave soldering tank which is installed in an automatic soldering apparatus to carry out soldering of printed circuit boards.

BACKGROUND ART

In an automatic soldering apparatus, various processing devices such as a fluxer, a preheater, a wave soldering tank, and a cooler are successively installed in the direction of travel of a conveyor which is installed above these processing devices. As a printed circuit board is being transported by the conveyor, it has flux applied to it by the fluxer, it is preheated by the preheater, it undergoes soldering in the wave soldering tank, and it is cooled by the cooler to perform soldering. Each of these processing devices affects the quality of soldering, but the effect of the wave soldering tank is particularly great.

A wave soldering tank carries out soldering of a printed circuit board by contacting the bottom surface of a printed circuit board with molten solder which is made to spout upwards. Therefore, a wave soldering tank is equipped with a discharge pump for pumping molten solder and a discharge nozzle for upwardly spouting molten solder which is pumped by the discharge pump. The discharge pump and the discharge nozzle are connected by a duct having the discharge pump installed at one end and having the discharge nozzle installed at the other end. The discharge pump is disposed inside a casing provided at the one end of the duct.

Molten solder which is sucked by the discharge pump is sent through the duct to the discharge nozzle and spouted upwards from the discharge nozzle. An inexpensive impeller pump has conventionally been used as a discharge pump, but in recent years, a screw pump has been used in order to eliminate pulsation of molten solder which is discharged by the pump. Therefore, in the following explanation, an example will be given of the case in which a screw pump is used as a discharge pump. A screw pump normally has a structure in which a single plate-shaped member is helically wrapped around the outer peripheral surface of a cylindrical rotating shaft, and the screw pump is housed inside a casing having a suction port for sucking molten solder. The rotating shaft of a screw pump passes through a through hole provided in the top of the casing and extends above the surface of molten solder and is connected to a drive source such as a motor. Molten solder is sucked on a helical path along the plate-shaped member on the outer periphery of the rotating shaft.

With this wave soldering tank, if a large amount of oxides is present in molten solder, the oxides may adhere to printed circuit boards. The oxides which adhered not only worsen the appearance of the boards, but if they straddle adjoining soldered portions of a printed circuit board and solder deposits thereon, they cause bridging. The principal locations where oxides develop in a wave soldering tank are the periphery of the discharge nozzle and the periphery of the rotating shaft of the screw pump.

In the periphery of the discharge nozzle, when molten solder which has spouted from a discharge nozzle falls and impacts the molten solder in the vicinity of the nozzle, air is sucked in the molten solder and oxides develop. Oxides mixed with solder becomes so-called dross which resembles water-containing sand. Since dross contains 5-10 mass % of oxides, it can be recovered after heating and stirring it together with a reducing agent or by squeezing under pressure. If a large amount of dross floats on the surface of molten solder in a wave soldering tank, it may overflow from the wave soldering tank such that it splatters or causes scorching of electrical wiring. Therefore, dross is recovered when a suitable amount has accumulated in the tank.

The rotating shaft of a screw pump rotates while immersed in molten solder. Therefore, molten solder in the periphery of the rotating shaft of a screw pump forms swirling. As a result, molten solder in this area oxidizes due to contact with air or rubbing by the rotating shaft. Accordingly, unlike the above-described dross which develops in the periphery of a discharge nozzle, oxides which develop in the periphery of the rotating shaft of a screw pump are pure oxides which have a black color and which do not have solder mixed therein.

In this manner, an swirling flow of molten solder exists in the periphery of a rotating shaft of a screw pump. Oxides which develop in the periphery of a screw pump are pulled downwards by this eddy flow. Oxides which are drawn downwards enter into the interior of the duct via the inlet from the screw pump, and they are spouted together with molten solder from the discharge nozzle and adhere to printed circuit boards. As a result, the oxides not only worsen the appearance of soldered portions but also adhere between soldered portions and cause bridging of printed circuit boards.

Patent Document 1 discloses an invention in which the periphery of a rotating shaft of a discharge pump is surrounded by a cylindrical member and oil which serves as an antioxidant is put in the interior of the cylindrical member in order to prevent the formation of oxides in the periphery of the discharge pump. According to that invention, due to the presence of oil surrounding the rotating shaft of the discharge pump, molten solder in the periphery of the rotating shaft of the discharge pump is isolated from air by the oil, and the formation of oxides in the periphery of the rotating shaft of the discharge pump is prevented.

However, in the invention disclosed in Patent Document 1, since oil, for example, is made to float atop high temperature molten solder, the oil generates smoke and deteriorates. The smoke flows to the exterior of the automatic soldering apparatus and worsens the operating environment. In addition, the smoke becomes soot, which not only pollutes the automatic soldering apparatus and various processing devices by adhering thereto, but if the soot adheres to the printed circuit boards being soldered, it pollutes the printed circuit boards and decreases their value as a product. In addition, since oil atop molten solder readily deteriorates at a high temperature and can maintain the effect of preventing oxidation for only a few hours, the oil must be exchanged with considerable frequency.

Patent Document 2 discloses an invention in which the formation of oxides in the periphery of a rotating shaft of a discharge pump is prevented by installing a protective pipe which projects above the surface of molten solder housed in a soldering tank and disposing the rotating shaft of the discharge pump so as to pass through the protective pipe. According to that invention, because the rotating shaft of the discharge pump passes through the protective pipe, the rotating shaft of the discharge pump is isolated by the protective pipe, and the formation of oxides in the periphery of the rotating shaft of the discharge pump is prevented.

However, in the invention disclosed in Patent Document 2, when there is a large gap between the protective pipe and the rotating shaft of the discharge pump, molten solder goes into the gap. Due to an increases in friction by the presence of molten solder penetrated into the interior of the gap, oxidation ends up becoming worse. If the gap is set to a narrow value so that molten solder will not penetrate into the gap between the protective pipe and the rotating shaft of the discharge pump, the protective pipe and the rotating shaft pump will rub against each other and damage each other, and smooth rotation of the rotating shaft of the discharge pump will be impaired. This is because in a wave soldering tank, solder is heated when the wave soldering tank is in use and is allowed to cool when it is not being used. Thermal expansion and thermal contraction at the time of use and at the time of non-use affect the protective pipe. When the gap becomes narrow, the protective pipe contacts the rotating shaft of the discharge pump. If the protective pipe even slightly deforms, as described above, they damage each other and smooth rotation cannot take place.

Patent Document 3 discloses an invention in which a plate-shaped member is made to elastically contact a rotating shaft of a discharge pump. By making rotating molten solder rebound against the rotating shaft of the discharge pump, the formation of oxides in the periphery of the discharge pump is prevented. According to that invention, the formation of an eddy flow due to rotation of the rotating shaft can be suppressed by contacting the plate-shaped member against the rotating shaft of the discharge pump.

However, in the invention disclosed in Patent Document 3, since molten solder in the periphery of the rotating shaft of the pump is agitated, oxidation cannot be completely prevented.

Patent Document 4 discloses an invention in which the formation of oxides is prevented over the entire area of a wave soldering tank, i.e., in the periphery of a rotating shaft of a discharge pump by installing a floating plate-shaped or box-shaped oxidation preventing member on the entire surface of molten solder except for the discharge nozzles, which is the surface where soldering takes place.

Patent Document 1: JP H3-36362 U
Patent Document 2: JP S52-56018 U
Patent Document 3: JP H1-150462 P
Patent Document 4: JP H5-50224 P

DISCLOSURE OF INVENTION

The invention disclosed in Patent Document 4 has the following problems (i)-(iii) in its practical application, and these make its practical application difficult.

(i) Regardless of how few oxides are formed in a wave soldering tank, high temperature molten solder continues flowing inside the tank. Therefore, during use of a wave soldering tank, oxides gradually adhere to and accumulate on flow straightening plates installed below the discharge nozzle, on the interior of the discharge nozzle, inside the duct connecting the discharge pump and the discharge nozzle, and in other locations. The accumulated oxides subsequently peel off and are spouted from the discharge nozzle together with molten solder and adhere to printed circuit boards. In order to prevent this from occurring, it is necessary to perform maintenance in which all of the molten solder housed inside a wave soldering tank is periodically scooped out and oxides adhering to each portion of the interior are removed. The invention of Patent Document 4 installs a large oxidation preventing member which covers all portions except for the discharge nozzle. Therefore, at the time of maintenance, it is necessary to lift the thick, large, and heavy oxidation preventing member above the wave soldering tank and remove it. In order to prevent the insertion hole for the rotating shaft of the discharge pump from catching on the rotating shaft when the oxidation preventing member is being removed, it is necessary to lift the oxidation preventing member upwards while maintaining it horizontal. If the oxidation preventing member is accidentally dropped onto the molten solder, the molten solder will splatter and expose the maintenance workers to an extremely dangerous situation. Therefore, it is necessary for the operation of removing the oxidation preventing member from the rotating shaft of the discharge pump to be carefully performed by a plurality of maintenance workers. As a result, this maintenance operation requires a considerable number of man hours.

(ii) As shown in FIG. 1 of Patent Document 4, molten solder which spouts from a discharge nozzle drops onto the sloping surface and flows downwards. The sloping surface is formed on the rim of the oxidation preventing member closest to the discharge nozzle. When the molten solder falls downwards and impacts the sloping surface, it causes the oxidation preventing member to oscillate, and as it oscillates, molten solder housed inside the wave soldering tank oscillates upwards and downwards. As a result, the height of spouting from the discharge nozzle fluctuates. When the height of spouting decreases, unsoldered portions develop due to molten solder not contacting printed circuit boards, and when the height of spouting increases, molten solder produces bridging between adjoining soldered portions of printed circuit boards.

(iii) When the oxidation preventing member causes oscillation of the surface of the molten solder, the insertion hole for the rotating shaft of the discharge pump rubs against the rotating shaft and the rotating shaft is damaged. In addition, the rotating shaft of the discharge pump is prevented from smoothly rotating. When the oxidation preventing member, which is large and heavy, even lightly contacts the rotating shaft of the discharge pump, it damages the rotating shaft of the discharge pump. If the rotating shaft of the discharge pump is damaged, molten solder adheres to the damaged portion, and components of the rotating shaft diffuse into the molten solder from the damaged portion, causing so-called leaching to develop.

In this manner, although formation of oxides can be prevented over the entire region of a wave soldering tank, i.e., in the periphery of the rotating shaft of a pump according to the invention disclosed in Patent Document 4, there are major problems (i)-(iii) which interfere with its practical application. Therefore, it has not been possible to provide a wave soldering tank which can be stably used for long periods while preventing formation of oxides in the periphery of the rotating shaft of a discharge pump.

The object of the present invention is to provide a wave soldering tank with excellent utility enabling it to be stably used for long periods, on which maintenance operations can be efficiently performed, which does not have fluctuations in the height of spouting, and which does not damage the rotating shaft of a discharge pump.

The present invention is a wave soldering tank characterized in that the tank comprises a tank body for housing molten solder, a discharge pump which is disposed inside the tank body for pumping molten solder, a rotating shaft which is connected to the discharge pump and extends upwards and is made of a material to which molten solder does not readily adhere, a discharge nozzle which is disposed inside the tank body for upwardly spouting molten solder which is sent to it by the discharge pump, a duct having the discharge pump installed at one end thereof and having the discharge nozzle installed at the other end thereof, an oxidation preventing member having a through hole through which the rotating shaft can pass with a gap and having a hollow portion in its interior for providing buoyancy and which floats above the discharge pump on the surface of molten solder, and an engaging means for regulating rotation of the oxidation preventing member in a horizontal plane, wherein the oxidation preventing member has a size which is larger than any swirling flows generated in the periphery of the rotating shaft and which is sufficiently large that the oxidation-preventing member is not affected by molten solder which spouts from the discharge nozzle and falls downward.

In a wave soldering tank according to the present invention, the size which is larger than any swirling flows generated in the periphery of a rotating shaft and which is not affected by molten solder which spouts from the discharge nozzle and falls downwards is preferably a size so as to cover a region which, in a horizontal cross section, is a circle having a diameter of at least two times the diameter of the rotating shaft around the center of the axis of the rotating shaft of the discharge pump. The size has an area which is at most 80% of the area of (the horizontal cross-sectional area of the wave soldering tank minus the horizontal cross-sectional area of the discharge nozzle).

A wave soldering tank according to the present invention preferably includes a surrounding member which extends downwards into the through hole of the oxidation preventing member and surrounds the rotating shaft with a gap between it and the rotating shaft. The surrounding member preferably extends 10-100 mm below the lower surface of the oxidation preventing member.

In a wave soldering tank according to the present invention, the discharge nozzle preferably has a suction port in its lower portion for sucking molten solder and/or the discharge pump preferably is a screw pump having, for example, 4 helical blades.

In a discharge pump according to the present invention, the engaging means preferably has a plurality of connecting rods which extend upwards inside the tank body to surround and engage the outer periphery of the oxidation preventing member.

In a wave soldering tank according to the present invention, a hollow portion is preferably formed around the entire outer periphery of the interior of the oxidation preventing member. Hollow portions may be formed in locations inside the oxidation preventing member which are symmetric with respect to the rotating shaft.

The material to which molten solder does not readily adhere in a wave soldering tank according to the present invention is preferably stainless steel or a titanium alloy.

In a wave soldering tank according to the present invention, since the periphery of the rotating shaft of the discharge pump is covered by an oxidation preventing member, the formation of oxides in the periphery of the rotating shaft of the discharge pump is suppressed. In addition, the size of the oxidation preventing member in a wave soldering tank according to the present invention is such that the oxidation preventing member is not affected by molten solder which drops from the discharge nozzle and such that the oxidation preventing member does not oscillate, as a result of which the height of the surface of molten solder contained in the wave soldering tank does not fluctuate. Even if the oxidation preventing member itself oscillates, as the horizontal area of the oxidation preventing member is relatively smaller than the horizontal area of the wave soldering tank, it does not cause the height of the surface of the entirety of the molten solder housed in the wave soldering tank to fluctuate.

Therefore, a wave soldering tank according to the present invention does not produce fluctuation in the height of spouted solder. In addition, the oxidation preventing member can be easily and safely removed when performing maintenance of the wave soldering tank. Therefore, the wave soldering tank has a high degree of practicality lacking in a conventional wave soldering tank.

Figure 1:
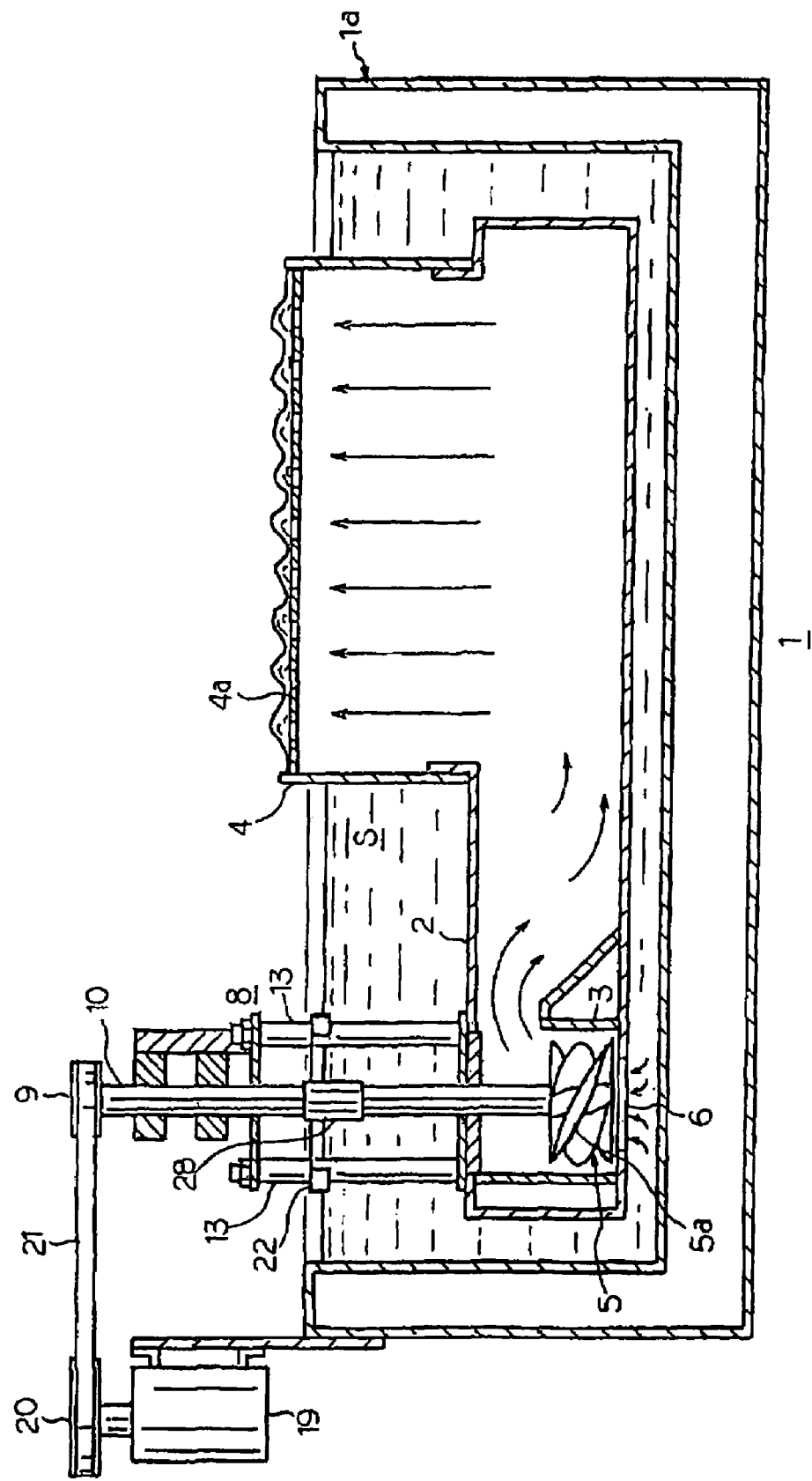
FIG. 1 is a cross-sectional view showing the structure of a wave soldering tank according to the present invention.

1 wave soldering tank body
2 duct
3 casing
4 discharge nozzle
5 screw pump
6 inlet
8 holding member
10 rotating shaft
11 bottom plate
12 top plate
13 connecting rod
22 oxidation preventing member
23 top plate
24 bottom plate
25 through hole
26 hollow portion
28 surrounding member

BEST MODE FOR CARRYING OUT THE INVENTION

The best mode for carrying out a wave soldering tank according to the present invention will be explained in detail while referring to the attached drawings.

Figure 2:
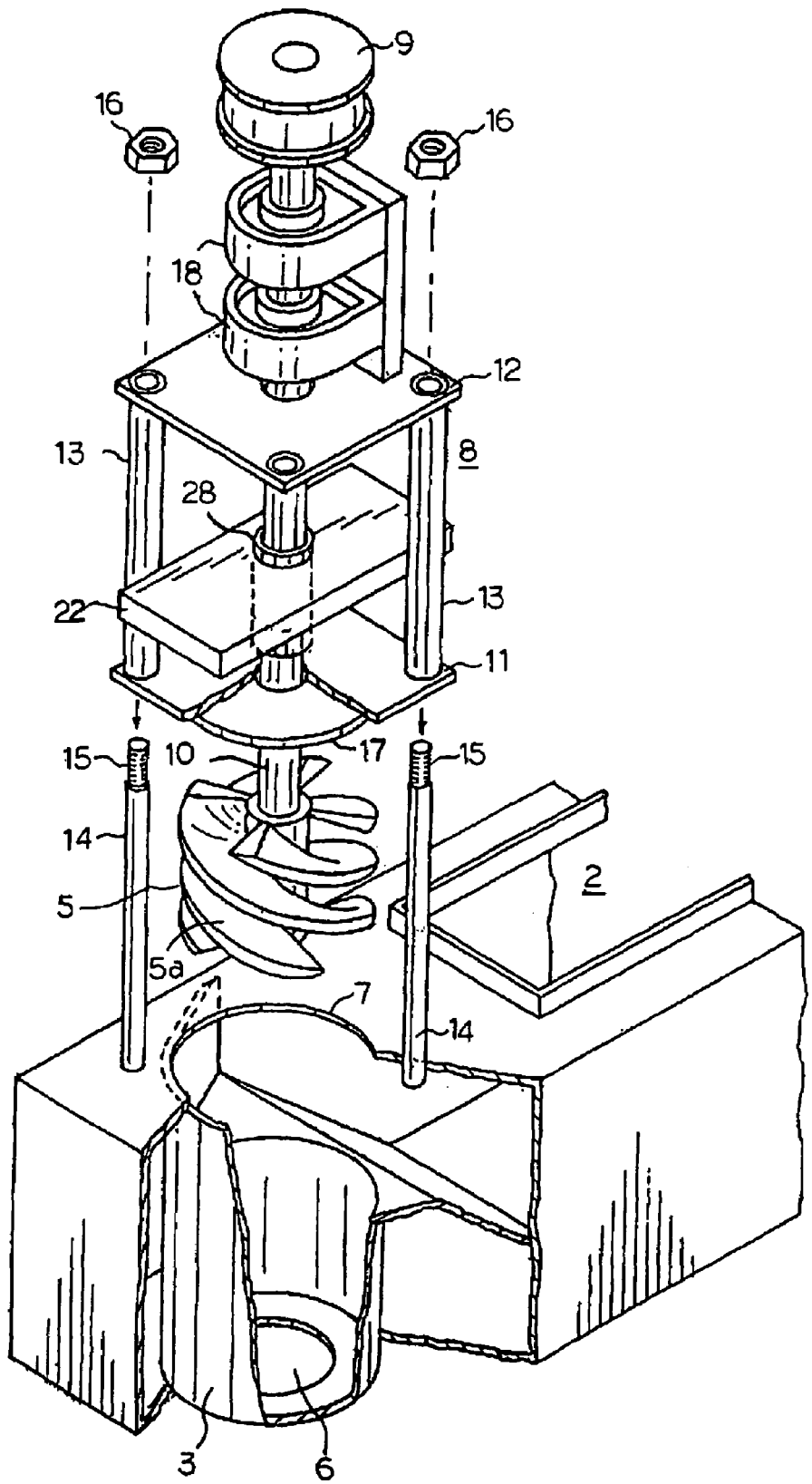
FIG. 2 is a perspective view showing the structure of the periphery of a discharge pump used in a wave soldering tank according to the present invention in an exploded state.
Figure 3:
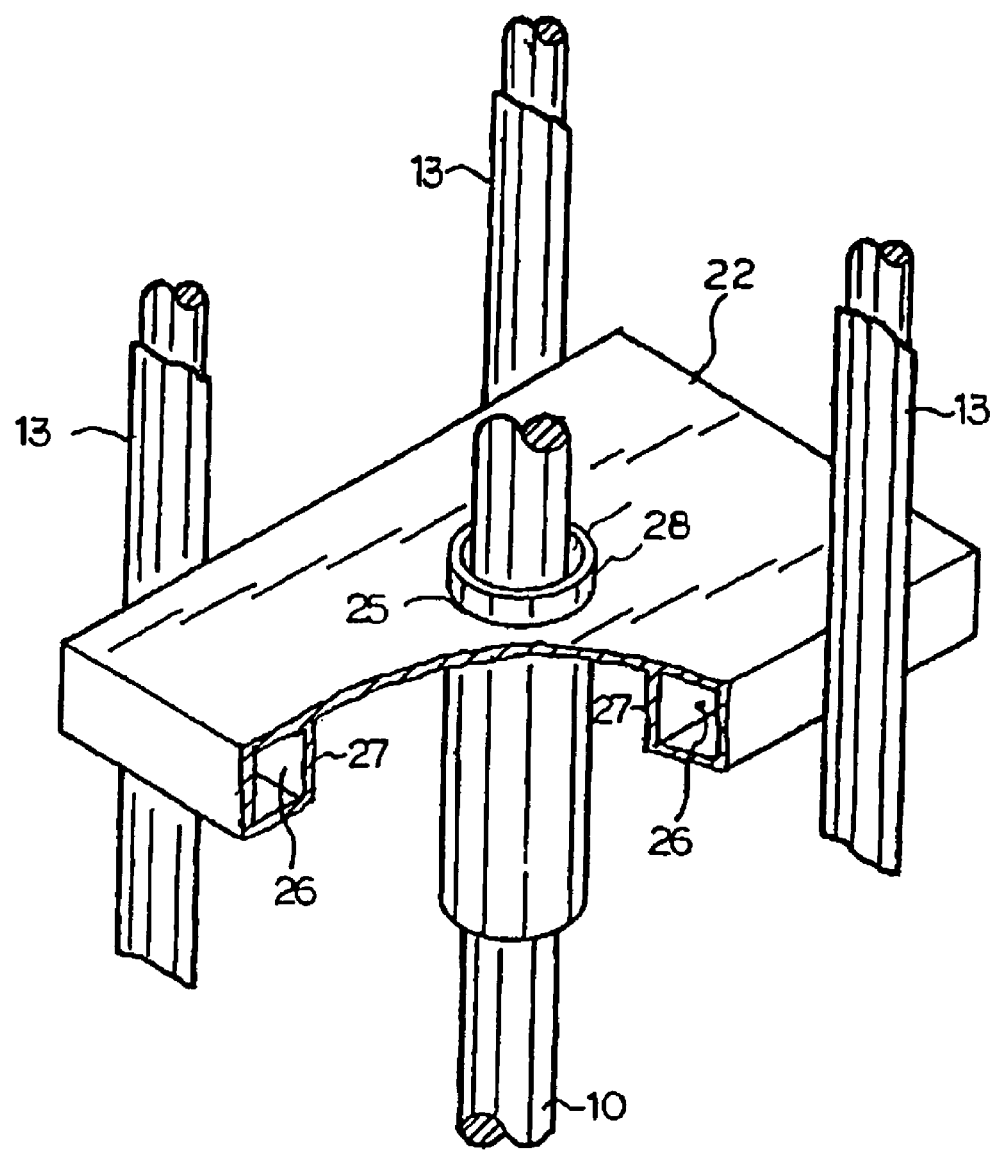
FIG. 3 is a partially cross-sectional perspective view of the structure of the main portions of an oxidation preventing member used in a wave soldering tank according to the present invention.
Figure 4:
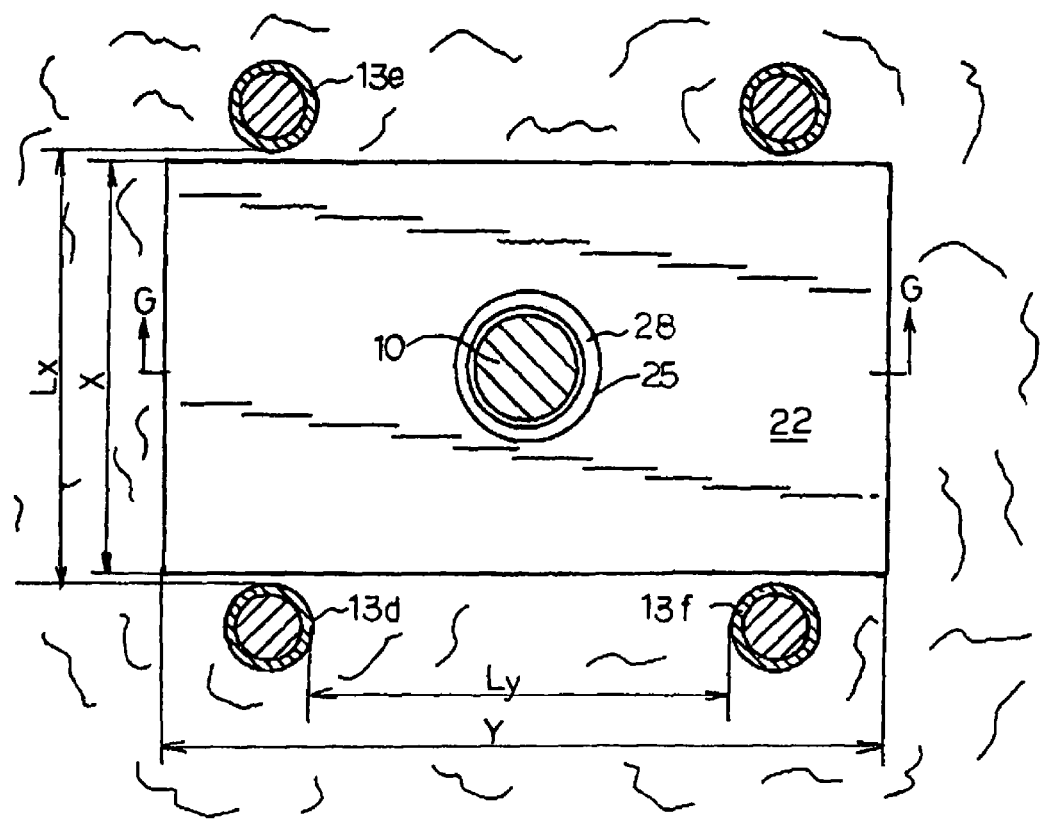
FIG. 4 is a plan view showing the arrangement of an oxidation preventing member used in a wave soldering tank according to the present invention.
Figure 5:
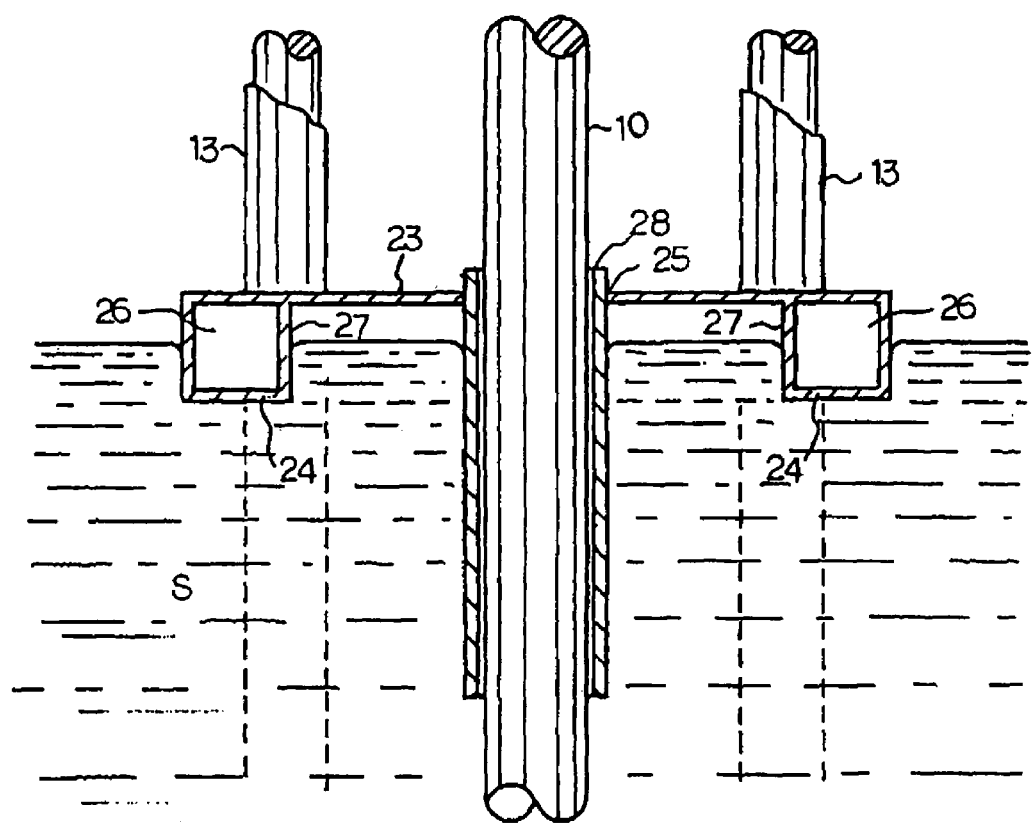
FIG. 5 is an explanatory view showing cross section G-G in FIG. 4.

FIG. 1 is a cross-sectional view showing the structure of a wave soldering tank of this embodiment, FIG. 2 is a perspective view showing the structure of the periphery of a discharge pump 5 used in the wave soldering tank 1 in an exploded state, FIG. 3 is a partially cross-sectional perspective view showing the structure of important portions of an oxidation preventing member 22 used in the wave soldering tank 1 of this embodiment, FIG. 4 is a plan view showing the arrangement of the oxidation preventing member 22 used in the wave soldering tank 1 of this embodiment, and FIG. 5 is an explanatory view showing cross section G-G in FIG. 4.

As shown in FIG. 1, the wave soldering tank 1 comprises a box-shaped body 1a which houses molten solder S and which is open at its upper end. A duct 2 is installed inside the body 1a. A casing 3 which has an inflow hole 6 for molten solder S in its bottom is installed at one end in the lengthwise direction (the left and right direction in FIG. 1) of the duct 2. A discharge nozzle 4 having a discharge port 4a at its upper portion which spouts molten solder S upwards is installed on the upper portion of the other end of the duct 2.

A screw pump 5 having helical blades 5a is installed inside the casing 3. In this embodiment, as shown in FIG. 2, the screw pump 5 has four helical blades 5a which are mounted on and wrapped around the outer peripheral surface of a rotating shaft 10.

As shown in FIG. 2, a pump insertion hole 7 having roughly the same diameter as the inner diameter of the casing 3 is formed in the duct 2 above the casing 3. A shaft holding member 8 is installed atop this pump insertion hole 7.

As shown in FIG. 1 and FIG. 2, the shaft holding member 8 comprises a lower plate 11 and an upper plate 12 connected by four connecting rods 13. The lower plate 11 and the upper plate 12 are connected by projecting from the upper plate 12 four support pillars 14 which pass through the interior of the connecting rods 13 and then securing nuts 16 to male threads 15 at the tops of the support pillars 14. The connecting rods 13 are hollow on their interior. The support pillars 14 are secured to the upper surface of the duct 2. As shown in FIG. 1, the connecting rods 13 have a length such that when the shaft holding member 8 is positioned atop the duct 2, the upper portion of the shaft holding member 8 is positioned sufficiently above the surface of the molten solder S.

An inlay plate 17 which can fit into the pump insertion hole 7 is secured to the lower plate 11.

As shown in FIG. 1 and FIG. 2, the rotating shaft 10 is rotatably mounted in the shaft holding member 8. The screw pump 5 is mounted at the lower end of the rotating shaft 10, and a pulley 9 is mounted at its upper end.

As shown in FIG. 2, the rotating shaft 10 is inserted into insertion holes formed in the inlay plate 17, the lower plate 11, and the upper plate 12 with gaps between the holes and the shaft. The upper end of the rotating shaft 10 is rotatably supported by two bearings 18, 18 secured to the upper plate 12. As shown in FIG. 1, the pulley 9 which is secured to the upper end of the rotating shaft 10 is driven by a pulley 20 of a motor 19 mounted on the body 1a and by a belt 21, and the rotating shaft 10 is driven by the pulley 9.

As shown in FIGS. 1-5, an oxidation preventing member 22 is disposed between the four connecting rods 13. As shown in FIG. 3 and FIG. 5, the oxidation preventing member 22 is a hollow box having a top plate 23 and a bottom plate 24. In the wave soldering tank 1 of this embodiment, although the extent of rotation is minute, the molten solder S in the periphery of the rotating shaft 10 of the screw pump 5 rotates with the rotation of the shaft to form an eddy. As described below, in this embodiment, an oxidation preventing member 22 is installed on the rotating shaft 10 of the screw pump 5. Since the formation of swirling can be impeded by the oxidation preventing member 22, the rotation of the molten solder S can be weakened with certainty. However, rotation of molten solder S cannot be completely eliminated by the oxidation preventing member 22, and as a result, the lower surface of the bottom plate 24 of the oxidation preventing member 22 is always rubbed by molten solder S. If the oxidation preventing member 22 is made from a metal such as a copper alloy or an aluminum alloy, the portion which is rubbed by molten solder S easily alloys with molten solder S and is wet thereby. If the oxidation preventing member 22 is wet, alloying progresses in the wetted portion, and eventually a hole forms. Therefore, in this embodiment, the oxidation preventing member 22 is made of a material to which it is difficult for molten solder S to adhere. Examples of such a material are metals such as stainless steel and titanium alloys.

As shown in FIGS. 2-5, through holes 25, 25 are formed at the center of the top plate 23 and the bottom plate 24, respectively. In this embodiment, a surrounding member in the form of a cylinder 28 is secured to the inner periphery of the through hole 25 by suitable means such as welding. The surrounding member surrounds the rotating shaft 10 and is separated therefrom by a prescribed gap and extends downwards.

By extending downwards from the bottom surface of the oxidation preventing member 22 by at least 10 mm and at most 100 mm, the cylinder 28 can effectively suppress the formation of oxides by molten solder flowing into the periphery of the rotating shaft 10. Therefore, use of the cylinder 28 is desirable.

Oxides develop between the rotating shaft 10 and the cylinder 28. These oxides splatter when they exit to the surface of the oxidation preventing member 22. Since the cylinder 28 projects upwards from the top surface of the oxidation preventing member 22 by at most 10 mm, the cylinder 28 can effectively prevent oxides from exiting to the surface of the oxidation preventing member 22, and splattering of oxides can be suppressed. However, if the cylinder 28 projects by more than 10 mm, molten solder adhering to the projecting portion cools and solidifies and interferes with smooth rotation of the rotating shaft 10. Therefore, the cylinder 28 is preferably installed so as to project upwards from the upper surface of the oxidation preventing member 22 by at most 10 mm.

In this embodiment, the rotating shaft 10 passes through the cylinder 28 with a gap between the rotating shaft 10 and the inner surface of the cylinder 28. The installation position of the cylinder 28, i.e., the position in which the through hole 25 is formed is preferably at the center of the oxidation preventing member 22 so as to avoid interference with the rotating shaft 10.

The diameter of the cylinder 28 is made a suitable size so as not to interfere with rotation of the rotating shaft 10. However, if the diameter is too large, oxides develop in the gap between the cylinder 28 and the rotating shaft 10. Therefore, the total value of the gaps between the cylinder 28 and the rotating shaft 10 on both sides of the rotating shaft 10 is preferably at least 0.2 mm and at most 1 mm.

As shown in FIG. 3 and FIG. 5, a hollow portion 26 is formed in the interior of the oxidation preventing member 22 by partitioning the oxidation preventing member 22 by vertical walls 27 provided in its interior. The hollow portion 26 has a square cross section which is sealed from the outside air. This hollow portion 26 is formed so as to impart buoyancy to the oxidation preventing member 22 and cause it to float atop molten solder S. A conventionally used Pb—Sn solder (Pb-63Sn) has a specific gravity of approximately 8.4, whereas stainless steel, which as described above is a preferred material for the oxidation preventing member 22, has a specific gravity of approximately 7.8, which is smaller than the specific gravity of Pb—Sn. Therefore, when the molten solder S is a Pb—Sn solder, the oxidation preventing member 22 can float on the surface of molten solder S without taking any special steps. However, when the molten solder S is a lead-free solder having Sn as a main component, since the specific gravity of this lead-free solder is approximately 7.4, the oxidation preventing member 22 could sink in the molten solder S. Such a lead-free solder has begun to be used in recent years. Therefore, in this embodiment, a hollow portion 26 is formed in the interior of the oxidation preventing member 22 so that the oxidation preventing member 22 can float on the surface of molten solder S even when the molten solder S is a lead-free solder.

Figure 6:
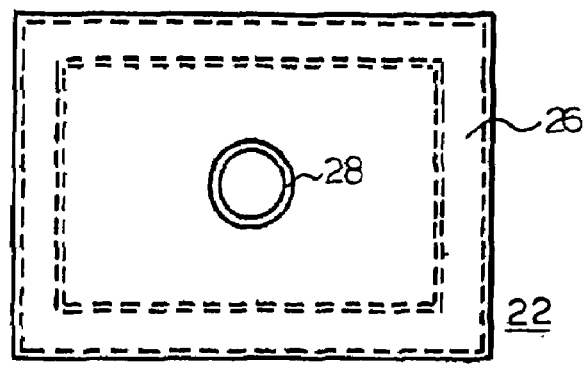
FIGS. 6(A)-6(C) are explanatory views showing variations of an oxidation preventing member used in a wave soldering tank according to the present invention.
Figure 6:
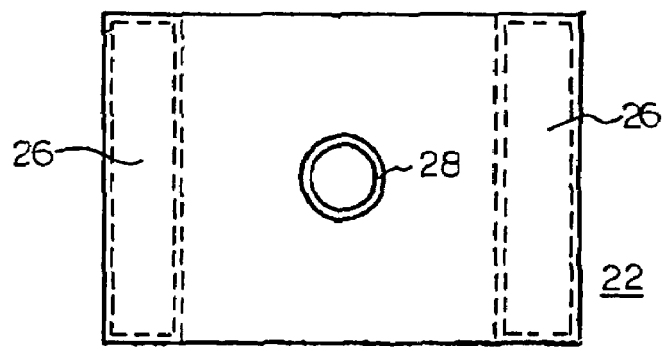
Figure 6:
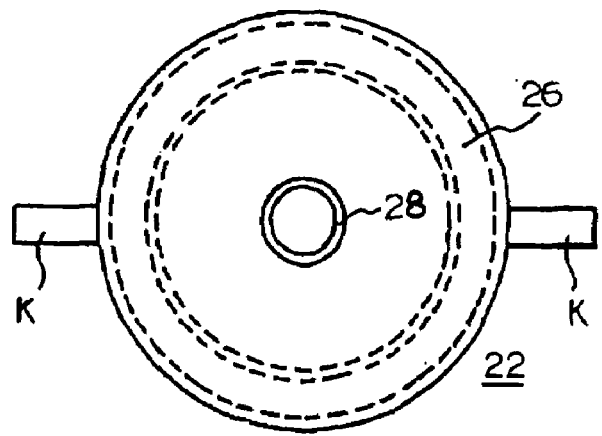

The hollow portion 26 of the oxidation preventing member 22 is sealed and formed so that molten solder S will not penetrate to its interior. As shown in FIGS. 6(A) and 6(C), the hollow portion 26 may be formed around the entire periphery of the oxidation preventing member 22, or as shown in FIG.

6(B), it may be formed in locations which are symmetrically disposed with respect to the rotating shaft 10. If the hollow portion 26 is formed so as to extend around the entire periphery of the oxidation preventing member 22 or so as to be symmetric with respect to the rotating shaft 10, the oxidation preventing member 22 can float in an attitude roughly parallel to the surface of the molten solder S. As a result, rubbing of the through holes 25, 25 provided in the upper plate 23 and the lower plate 24 against the rotating shaft 10 is prevented and the rotating shaft 10 is not readily damaged.

The oxidation preventing member 22 may have any shape, such as the rectangular shape in plan shown in FIGS. 6(A) and 6(B), a circular shape in plan as shown in FIG. 6(C), an elliptical shape, a polygonal shape, or the like.

As stated above, in this embodiment, a through hole 25 is provided at the center of the bottom plate 24, and the rotating shaft 10 passes through the through hole 25. However, it is instead possible to cut out a rectangular region partitioned by four vertical walls in the interior of the bottom plate 24. As a result, the weight of the center of the oxidation preventing member 22 can be decreased, and in cooperation with the above-described hollow portion 26, the oxidation preventing member 22 can be made to more stably float atop the surface of molten solder. As a result, contact between the cylinder 28 and the rotating shaft 10 caused by sloping of the floating oxidation preventing member 22 can be prevented with certainty.

The oxidation preventing member 22 in this embodiment must not rotate with the molten solder S although the molten solder rotates together with the rotation of the rotating shaft 10. In this embodiment, rotation of the oxidation preventing member 22 is prevented by using the four connecting rods 13 as an engaging means for the oxidation preventing member 22. Examples of the engaging means which can engage with the oxidation preventing member 22 include constituent elements (connecting rods 13) of the holding member 8 as shown in FIGS. 1-5. Alternatively, as shown in FIG. 6(C), an engaging portion K can be formed so as to project from a portion of the oxidation preventing member 22, and this engaging portion K can engage with a suitable engaging portion provided on the interior of the wave soldering tank 1.

As shown in FIG. 4, the length X of the short sides of the oxidation preventing member 22, which has a rectangular shape as viewed in plan, is slightly shorter than the length Lx between the inner sides of adjoining connecting rods 13d, 13e in the lengthwise direction (the vertical direction in the figure). The length Y of the long sides of the oxidation preventing member 22 is preferably longer than the length Ly between the inner sides of adjoining connecting rods 13d, 13f in the widthwise direction (to the left and right in the figure). By setting length X of the short sides and length Y of the long sides of the oxidation preventing member 22 in this manner, if the oxidation preventing member 22 attempts to pivot due to rotation of the molten solder S, it does not pivot because the long sides of the oxidation preventing member 22 engage with the four connecting rods.

The holding member 8 is spaced from the discharge nozzle 4, and the oxidation preventing member 22 has a size such that it can be housed inside the holding member 8. Therefore, the oxidation preventing member 22, which is disposed between the four connecting rods, is not affected by molten solder which spouts from the discharge nozzle 4 and drops. Namely, it is not struck by molten solder S which drops from the discharge nozzle 4 and it is not rocked by waves caused by falling molten solder S.

The size of the oxidation preventing member 22 must be larger than any swirling flows which develop in the periphery of the rotating shaft 10 of the screw pump 5. As described above, oxides which develop in the periphery of the rotating shaft 10 are caused by swirling of the molten solder S. Therefore, unless the oxidation preventing member is large enough to completely cover any swirls, it cannot be expected to provide an effect of suppressing swirls. However, if the oxidation preventing member 22 is too large, due to the effect of waves caused by molten solder S which is ejected and drops from the discharge nozzle 4, the oxidation preventing member 22 oscillates up and down on the surface of the molten solder S, and the up and down oscillations cause fluctuation in the height of solder spouted from the discharge nozzle 4. Therefore, the size of the oxidation preventing member 22 must be restricted to a size such that falling molten solder S does not strike against it and such that it does not undergo large oscillations due to waves caused by falling molten solder.

Specifically, the oxidation preventing member 22 preferably has a size so as to completely cover "a region which, in a horizontal cross section, is a circle having a diameter of at least two times the diameter of the rotating shaft around the center of the axis of the rotating shaft of the discharge pump and which has an area of at most 80% and preferably at most 50% of the area of [(the horizontal cross-sectional area of the wave soldering tank)–(the horizontal cross-sectional area of the discharge nozzle)]".

The behavior of molten solder S in a wave soldering tank of this embodiment will be explained.

In FIG. 1, as the motor 19 is started and rotated, the pulley 20 connected to the motor 19 rotates, and this rotation rotates the pulley 9 of the rotating shaft 10 of the screw pump 5 through the belt 21. As a result, the screw pump 5 connected to the rotating shaft 10 rotates, and molten solder S flows from the inlet 6 provided in the bottom of the screw pump 5 into the interior of the duct 2. The molten solder S is pumped through the duct 2 to the discharge nozzle 4 and is made to spout upwards from the discharge nozzle 4. The top portion of the molten solder S which spouts from the discharge nozzle 4 is made to contact the bottom surface of an unillustrated printed circuit board, and solder is adhered to the portions to be soldered of the printed circuit board.

In the wave soldering tank 1 of this embodiment, the oxidation preventing member 22 is installed so as to float atop the surface of the molten solder S surrounding the rotating shaft 10 which passes through it. The molten solder S contacts the bottom plate 24 of the oxidation preventing member 22. Therefore, even though the rotating shaft 10 of the screw pump 5 rotates and the molten solder attempts to rotate, the formation of swirls is suppressed by the oxidation preventing member 22, and it becomes difficult for swirling to occur in the molten solder S. Therefore, the formation of eddies in the molten solder S in the periphery of the rotating shaft 10 of the screw pump 5 is essentially prevented in a wave soldering tank 1 according to this embodiment.

At this time, the molten solder S below the oxidation preventing member 22 is not completely prevented from rotating, and it slightly rotates. However, due to the resistance of the oxidation preventing member 22, the speed of rotation is greatly suppressed. The oxidation preventing member 22 moves up and down with the increase and decrease in molten solder S housed in the wave soldering tank 1. Therefore, the oxidation preventing member 22 is always present on the surface of the molten solder S and can continue to suppress the formation of eddies. As a result, friction between the rotating shaft 10 and the molten solder S decreases, and formation of oxides due to friction is thereby suppressed during rotation of the rotating shaft 10.

In the wave soldering tank 1 of this embodiment, since the molten solder S in the periphery of the rotating shaft 10 is covered by the oxidation preventing member 22, contact of the molten solder S with air is prevented, and formation of oxides is further suppressed.

The periphery of the rotating shaft 10 is covered by the cylinder 28. Therefore, oxidation of molten solder S due to contact between the molten solder S and the rotating shaft 10 as it rotates is suppressed, and the formation of oxides is suppressed.

In the wave soldering tank 1 of this embodiment, the oxidation preventing member 22 is not fixed in position. If the cylinder 28 contacts the rotating shaft 10, as the oxidation preventing member 22 is light, the cylinder 28 immediately rebounds from the rotating shaft 10 due to the reaction force it receives from the rotating shaft 10, and scuffing does not occur on the rotating shaft 10. Therefore, in a wave soldering tank 1 of this embodiment, the rotating shaft 10 of the discharge pump is not damaged by rubbing against the cylinder 28, and smooth rotation of the rotating shaft 10 of the discharge pump 5 is not prevented. In this manner, since the oxidation preventing member 22 is small and light weight, it does not damage the rotating shaft 10 when it only lightly touches the rotating shaft 10 of the screw pump 5. Therefore, so-called dissolution of the rotating shaft 10 does not take place, and the effect of lengthening the lifespan of the rotating shaft 10 can be obtained.

In the wave soldering tank 1 of this embodiment, a small amount of oxides of solder is formed in the gap between the rotating shaft 10 and the cylinder 28. The penetration of air into this gap is obstructed by the oxides, and further oxidation of the molten solder S is suppressed.

Due to these effects, a wave soldering tank 1 of this embodiment can effectively suppress the formation of oxides.

In addition, with the wave soldering tank 1 of this embodiment, the oxidation preventing member 22 needs to be lifted up and removed at the time of maintenance of the wave soldering tank 1. Since the oxidation preventing member 22 is small in size and has a reduced weight, it is easy to lift the oxidation preventing member 22 upwards while maintaining it in a horizontal attitude, and the operation of pulling the oxidation preventing member 22 from the rotating shaft 10 of the discharge pump 5 can be performed by a single worker. Therefore, ease of maintenance can be greatly increased.

In a wave soldering tank 1 according to this embodiment, the oxidation preventing member 22 has a size so as not to greatly oscillate under the influence of falling molten solder, and specifically, it has a size so as to completely cover "a region which, in a horizontal cross section, is a circle having a diameter of at least two times the diameter of the rotating shaft around the center of the axis of the rotating shaft of the discharge pump as a center and which has an area of at most 80% of the horizontal cross-sectional area of the wave soldering tank minus the horizontal cross-sectional area of the discharge nozzle". Therefore, even when molten solder 4a is being spouted from the discharge nozzle 4, the molten solder S housed in the wave soldering tank 1 does not oscillate.

As a result, with a wave soldering tank 1 according to the present embodiment, the formation of oxides in the periphery of the rotating shaft 10 can be suppressed with certainty, the height of spouting from the discharge nozzle 4 does not fluctuate, and the occurrence of so-called unsoldered portions and the occurrence of bridging between adjoining portions to be soldered of a printed circuit board are prevented.

In this embodiment, by (a) making the size of the oxidation preventing member 22 such that it does not greatly oscillate under the effect of falling molten solder and specifically such that it has a size so as to completely cover "a region which, in a horizontal cross section, is a circle having a diameter of at least two times the diameter of the rotating shaft around the center of the axis of the rotating shaft of the discharge pump and which has an area of at most 80% of the area of (the horizontal cross-sectional area of the wave soldering tank)–(the horizontal cross-sectional area of the discharge nozzle)", (b) providing the suction port for molten solder S in a lower portion of the screw pump 5, the lower portion of the screw pump 5 being not readily influenced by up and down movement of the oxidation preventing member 22 on the surface of molten solder S, and (c) using a screw pump 5 having four helical blades 5a which does not readily produce pulsation as a discharge pump which makes molten solder S flow inside the duct 2 towards the discharge nozzle 4, the flow rate per unit time of molten solder S flowing inside the duct 2 towards the discharge nozzle 4 can be made constant, and fluctuations in the height of solder spouted from the discharge nozzle 4 can be effectively eliminated.

In this manner, a wave soldering tank 1 of this embodiment has a high degree of utility in that it can prevent the formation of oxides in the periphery of the rotating shaft 10 with certainty while being capable of stable use thereof for long periods.

In the explanation of this embodiment, an example was given of the case in which the discharge pump was a screw pump. However, the present invention is not limited to a screw pump, and a pump which is known as a pressure source for molten solder such as an impeller pump or a propeller pump can be employed in the same manner.

In the explanation of this embodiment, an example was given of the case in which an engaging means for an oxidation preventing member was four connecting rods. However, the present invention is not limited to this embodiment, and it is possible to install a suitable engaging member on the body, the duct, the discharge nozzle, or the like and perform engaging without using connecting rods.

Example 1

The present invention will be explained more specifically while referring to an example.

Soldering of printed circuit boards was carried out using an automatic soldering apparatus according to the present invention incorporating the wave soldering tank shown in FIGS. 1-6.

Here, the length Lx between the inner sides of the connecting rods 13e, 13d in FIG. 4 was 64 mm, the length Ly between the inner sides of connecting rods 13d, 13f was 88 mm, and the diameter of the rotating shaft 10 was 20 mm. The oxidation preventing member 22 had short sides with a length X of 60 mm and long sides with a length Y of 110 mm. The separation between the top plate 23 and the bottom plate 24 in FIG. 5 was 13 mm, through holes 25 having a diameter of 20.5 mm were formed at approximately the center of the top plate 23 and the bottom plate 24, and a hollow portion 26 having a square transverse cross section measuring 12 mm on a side was formed on the periphery of the interior of the oxidation preventing member 22. The oxidation preventing member 22 was formed of stainless steel.

The amount of oxides which were formed in the periphery of the rotating shaft 10 of the screw pump 5 was measured when the wave soldering tank was continuously operated for 24 hours and found to be 26.4 grams.

In contrast, when soldering of printed circuit boards was carried out under the same conditions using an automatic soldering apparatus incorporating a conventional wave soldering tank not equipped with an oxidation preventing member 22, the amount of oxides formed in the periphery of the rotating shaft of the screw pump 5 was 1704 grams, which was an extremely large amount.

The invention claimed is:

1. A wave soldering tank comprising:
a tank body for housing molten solder,
a discharge pump which is installed inside the tank body for pumping molten solder,
a rotating shaft which is connected to and extends upwards from the discharge pump,
a discharge nozzle installed inside the tank body for upwardly spouting molten solder which is sent to it by the discharge pump,
a duct which is installed inside the tank body and which has the discharge pump installed at one of its ends and the discharge nozzle installed at its other end,
an oxidation preventing member which has a through hole for passage of the rotating shaft with a gap therebetween and a hollow portion in its interior for producing buoyancy so that the oxidation preventing member will float above the discharge pump on the surface of molten solder, and
an engaging mechanism which restricts rotation of the oxidation preventing member in a horizontal plane and comprises a plurality of stationary connecting rods which extend upwards in the interior of the tank body along the outer periphery of the oxidation preventing member,
wherein the oxidation preventing member comprises a top plate, a bottom plate spaced from the top plate, and walls extending between the top and bottom plates and forming at least one sealed chamber along a periphery of the oxidation preventing member for imparting buoyancy to the oxidation preventing member, and the oxidation preventing member has a size which is larger than any swirling flows which form in the periphery of the rotating shaft and which is such that the oxidation preventing member is not affected by molten solder which spouts from the discharge nozzle and falls downwards.

2. A wave soldering tank as set forth in claim 1 wherein the oxidation preventing member has a size so as to cover a circular horizontal region which is centered on the axis of the rotating shaft and which has a diameter of at least two times the diameter of the rotating shaft and which has an area of at most 80% of the difference between the horizontal cross-sectional area of the wave soldering tank and the horizontal cross-sectional area of the discharge nozzle.

3. A wave soldering tank as set forth in claim 1 further comprising a surrounding member which extends downwards in the through hole of the oxidation preventing member and surrounds the rotating shaft with a gap between it and the rotating shaft.

4. A wave soldering tank as set forth in claim 3 wherein the surrounding member projects downwards from the bottom surface of the oxidation preventing member by at least 10 mm to at most 100 mm.

5. A wave soldering tank as set forth in claim 1 wherein the discharge nozzle has a suction port for sucking molten solder in the bottom thereof.

6. A wave soldering tank as set forth in claim 1 wherein the discharge pump is a screw pump.

7. A wave soldering tank as set forth in claim 6 wherein the screw pump has 4 helical blades.

8. A wave soldering tank as set forth in claim 1 wherein the hollow portion extends around the entire outer periphery of the oxidation preventing member.

9. A wave soldering tank as set forth in claim 1 wherein the oxidation preventing member includes a plurality of hollow portions in its interior which are symmetrically disposed with respect to the rotating shaft.

10. A wave soldering tank as set forth in claim 1 wherein the rotating shaft comprises stainless steel or a titanium alloy.

11. A wave soldering tank comprising:
a tank body for housing molten solder,
a discharge pump installed inside the tank body for pumping molten solder,
a rotational drive shaft which is connected to and extends upwards from the discharge pump,
a discharge nozzle for upwardly spouting molten solder,
a duct extending between the discharge pump and the discharge nozzle,
an oxidation preventing member which is buoyant in molten solder and has a hole through which the drive shaft passes, wherein the oxidation preventing member comprises a top plate, a bottom plate spaced from the top plate, and walls extending between the top and bottom plates and forming at least one sealed chamber along a periphery of the oxidation preventing member for imparting buoyancy to the oxidation preventing member, and
first and second stationary connecting rods which extend upwards inside the tank body, the oxidation preventing member being disposed between the connecting rods in a position such that rotation of the oxidation preventing member about the drive shaft in a first direction is stopped by contact between the oxidation preventing member and the first connecting rod and rotation of the oxidation preventing member about the drive shaft in a second direction is stopped by contact between the oxidation preventing member and the second connecting rod.

12. A wave soldering tank as claimed in claim 11 wherein the oxidation preventing member is rectangular as viewed in plan with a length and a width, and the wave soldering tank includes third and fourth stationary connecting rods which extend upwards inside the tank body, the first and third connecting rods being disposed along a first lengthwise side of the oxidation preventing member and the second and fourth connecting rods being disposed along a second lengthwise side of the oxidation preventing member with the oxidation preventing member being disposed between the third and fourth connecting rods.

13. A wave soldering tank as claimed in claim 11 including a tube extending downwards from the oxidation preventing member and surrounding the drive shaft.

14. A wave soldering tank as claimed in claim 11 including a bearing for rotatably supporting the drive shaft supported by the connecting rods.

15. A wave soldering tank as claimed in claim 1 wherein the oxidation preventing member is movable in a lengthwise direction of the shaft with respect to the shaft and the connecting rods to enable the oxidation preventing member to move up and down in the tank body as a level of molten solder in the tank body varies.

* * * * *